July 11, 1939. S. E. LINCHITZ 2,165,558
DENTURE
Filed Jan. 24, 1938
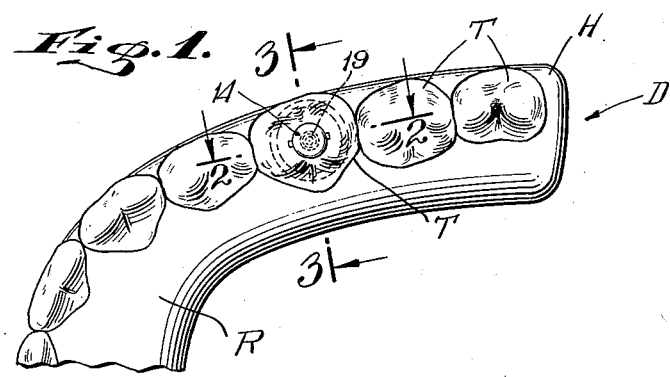
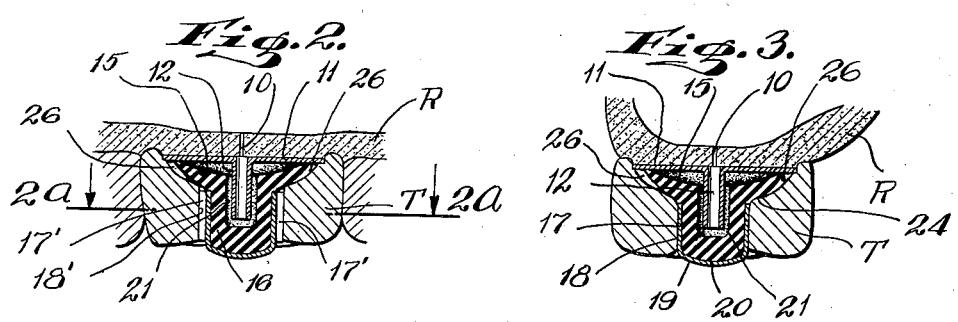
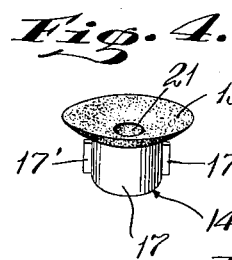
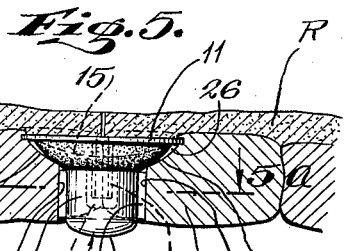
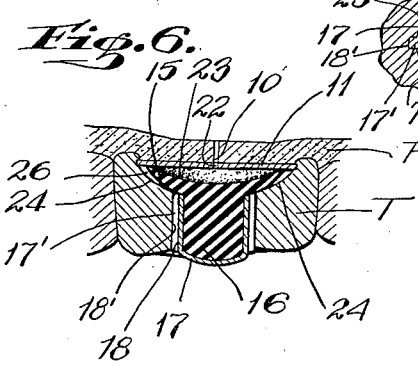
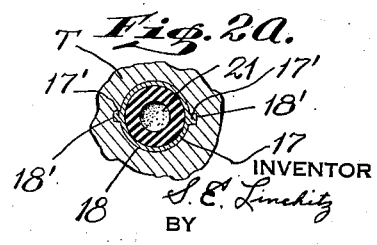
INVENTOR
S. E. Linchitz
BY
ATTORNEY Patented July 11, 1939

2,165,558

UNITED STATES PATENT OFFICE 2,165,558

DENTURE

Samuel E. Linchitz, New York, N. Y.

Application January 24, 1938, Serial No. 186,522

9 Claims. (Cl. 32—3)

The present invention is generally directed to dentures and is especially concerned with a roofless denture having improved means for readily attaching and holding the denture to the gum of the mouth of the user and an object of the invention is to provide an improved roofless denture having a rim appropriately grooved or shaped to the gum of the mouth and carrying plate means cooperatively associated with suction creating means for effectively holding the rim to the gum. The invention has as another object the provision of a roofless denture shaped to be comfortably held to the gum of the user by reason of vertically displaceable suction creating means slidably guided by one or more teeth depending from the rim of the denture. The invention further contemplates as an object the utilization of a suction creating device or cup having a portion projecting slightly below surrounding depending tooth means of the denture whereby the projecting portion can be readily actuated to deform the suction creating cup to permit a gripping and yieldable flange thereof after expansion of the cup to produce the required holding relation between the flange and the plate means carried by the rim and between the latter and the gum. The invention has as a further object the provision of a roofless and serviceable denture which can be suspended from the gum of the mouth in the utilization of relatively few and relatively small localized exterior surface portions of the gum to which the denture is sustained by the suction creating means. Other objects, features, and advantages of the invention will appear from the following detailed description considered in connection with the accompanying drawing in which:

Fig. 1 is an underneath view of a fragmentary part of the improved roofless denture according to my invention.

Fig. 2 is a sectional view on the line 2—2 of Fig. 1.

Fig. 2ª is a sectional view on the line 2ª—2ª of Fig. 2.

Fig. 3 is a sectional view on the line 3—3 of of Fig. 1.

Fig. 4 is a perspective view of the suction cup.

Fig. 5 is a fragmentary view of a palateless or roofless denture showing a slightly modified form.

Fig. 5ª is a sectional view on the line 5ª—5ª of Fig. 5 and

Fig. 6 is a view similar to Fig. 2 however with the depending tube portion of the plate means omitted.

Illustrative of the several embodiments disclosed, the denture is generally denoted D and comprises the depending rim R to which is secured the depending teeth T. The denture is made of conventional and moldable material well known in the art and the teeth of course are artificial. The rim R is appropriately shaped to receive and straddle the exterior surface of the gum of the mouth of the user.

The rim is provided with one or more relatively small apertures 10 and fixedly fastened by any well known means to the bottom surface of the rim is the plate 11 having a depending positioning tube 12, the bore of which is in alinement with a respective aperture 10.

Concentrically surrounding tube 12 and spaced therefrom is the rubber suction creating device or cup 14 which comprises a relatively wide concavo-convex tapered flange 15 merging with the depending reduced neck 16 on which is fixedly mounted the metal protective cap generally denoted 17 disposed within bore 18 of a surrounding tooth T. This cap 17 is provided with laterally extending keys or lugs 17' and a closely fitting crown 19 having a lower part 20 normally projecting slightly beyond and below its companion tooth T which may be of metal or of any other suitable material. Keys 17' are slidably disposed in the opposed guide slots 18' in communicating bore 18 of the surrounding tooth T.

As shown in Fig. 1 only one tooth is provided with the suction creating device or cup but it is to be understood that the other arm (not shown) of the denture also includes a similar device in cooperation with a fixed plate 11 which may be of metal or any other material, and although only one tooth of the arm A of the denture D is provided with suction creating means, it is within the province of the invention to provide other teeth thereof with similar means.

With the rim of the denture positioned to straddle the gum and although not secured thereto, the denture however may be readily secured to the gum by applying an upwardly directed force to the crown 19. This may be accomplished by the teeth of the lower jaw of the user or by applying finger pressure.

If therefore crown 19 is slidably actuated, neck 16 will be shifted upwardly in a corresponding direction. Consequently a part of the cup is deformed and the air within pocket or recess 21 spaced from the tube or nipple 12 is partially expelled and the relatively thin marginal lip of the annular sensibly resilient flange 15 positively engages plate 11 to provide a seal therebetween. However upon the removal of pressure from cap 17, neck 16 with the fixed cap 17 starts to automatically move downwardly and outwardly to assume its normal position in which case lower part 20 of the crown 19 of cap 17 is slightly beyond its fixed guide tooth T and since the interior of the cup is now at less than atmospheric pressure, rim R is held to the gum and so long as this difference of pressure exists flange 15 firmly grips plate 11 until the partial vacuum created is broken and of course where the partial vacuum is sustained rim R is held fixed to and suspended from the gum.

If for any reason the holding action between the rim and gum is broken, the gripping action between flange 15 and plate 11 is removed but such gripping relation can be readily restored by actuating and shifting crown 19 as explained and thus gripping relation between flange 15 and plate 11 may be readily set up again and consequently the rim R is again firmly held to the gum.

In the form according to Fig. 5, the suction creating device 14 is slidably guided between two fixed depending and adjacent teeth each of which includes a guide slot 18' for positioning and guiding a laterally extending lug 17' while in Fig. 6, the positioning tube 12 for the suction creating device of the type shown in Fig. 3 is removed and instead plate 11 merely includes a relatively small opening or orifice 22 in communication with the recess or interior 23 of flange 15 to aid in setting up a partial vacuum therein upon partial withdrawal of the cup after flange 15 has been collapsed and its should be observed that in the form according to Figs. 2-5 inclusive, the tube 12 projects into the bore or recess 21 of the neck or reduced stud 16 although it is spaced from the walls of this recess which during assembly permits the cup to be readily positioned in respect to plate 11 and after assembly the lower wall of this recess limits upward displacement of the stud.

In the form according to Figs. 3 and 6 the wall of the expanded concavity 24 constitutes a seat for the annular flange 15 and normally holds the cup 14 in a predetermined position while in Fig. 5 the adjacent teeth each include a concavity 24 defining meeting and complementary seat means for a similar purpose and the adjacent teeth in Fig. 5 each include a groove 25 defining the bore 18 which slidably guides the bodily fixed cap 17 while keys 17' are guided in slots 18' in communication with grooves 25 and in all of the forms disclosed there is adequate clearance 26 between the flange 15 and seat 24 to permit this flange to be collapsed.

Without further analysis, the foregoing disclosure will so fully reveal the gist of the present invention that others can by applying current knowledge readily adapt it to various applications without omitting certain features, that from the standpoint of the prior art, fairly constitute the essential characteristics of the generic and specific aspects of the invention and therefore such adaptations should and are intended to be comprehended within the meaning and range of equivalency of the following claims:

I claim:

1. In a denture, a rim adapted to be secured to a gum and having an opening, a tooth depending from said rim and including a concavity and a bore communicating with said concavity, a plate secured to said rim and having means communicating with said opening, and a suction device having a flange surrounding said opening and disposed in said concavity and having a reduced part slidably guided by the wall of said bore and normally projecting slightly below said tooth.

2. In a denture, a rim adapted to be secured to a gum and having an opening, a plate secured to said rim and including means communicating with said opening, a fixed tooth depending from said gum and including an expanded and reduced opening in communication, a suction device having an expanded part disposed in said expanded opening and a reduced part slidably guided in said reduced opening, and a crown secured to said reduced part and having a portion normally projecting beyond and outside of said tooth.

3. In a denture, a rim having an opening, a plate secured to said rim and having means communicating with said opening, toothed means fixedly depending from said rim and comprising a concavity and a bore in communication with said concavity, a suction cup within said toothed means and including an elastic flared portion disposed in said concavity and a reduced portion slidably guided by the wall of said bore, and a cap closely fitting said reduced portion and having a lower portion thereof extending slightly beyond a lower surface of said toothed means.

4. In a denture, a rim having an opening, a plate secured to said rim and having means communicating with said opening, toothed means fixedly depending from said rim and comprising a concavity and a bore in communication with said concavity, a resilient suction cup within said toothed means and including an elastic flared portion disposed in said concavity and surrounding said means communicating with said opening and having an extension slidably guided by the wall of said bore, a cap secured to and encompassing said extension and having a crown portion projecting slightly beyond a lower surface of said toothed means.

5. In a denture, a rim adapted to straddle a gum and having an opening, a plate secured to said rim and having means communicating with said opening, toothed means fixedly depending from said rim and comprising a concavity and a bore in communication with said concavity, a resilient suction cup within said toothed means and including an elastic flared portion disposed in said concavity and surrounding said means communicating with said opening and having an extension slidably guided by the wall of said bore, a cap secured to and encompassing said extension and having a crown portion projecting slightly beyond a lower surface of said toothed means, said cap upon the application of finger pressure thereon adapted to deform said flared portion to expel air from the cup and upon removal of said pressure said flared portion expands to set up a partial vacuum within said cup to hold said rim to said gum.

6. In a denture, a rim adapted to straddle and be removably secured to a gum and having an opening, a plate secured to said rim and including a depending tube in communication with said opening, toothed means fixedly depending from said rim and including a concavity and a bore in communication with said concavity, a suction cup surrounding said tube and having resilient flange means disposed within said concavity adapted to grip said plate and including a depending part slidably guided by the wall of said bore, and a cap secured to said depending part and having a portion normally projecting outside of said toothed means.

7. In a denture, a rim adapted to straddle a gum and be removably secured thereto and having an opening, a plate secured to said rim and having means in communication with said opening, a pair of teeth depending from said rim and including means comprising a concavity and bore in communication with said concavity, a suction creating device having a resilient flange disposed within said concavity and adapted to grip said plate and having a depending part slidably guided by the wall of said bore, and a crown secured to depending part and slidably guided by the wall of said bore.

8. In a denture, a rim adapted to be secured to a gum and having an opening, a fixed tooth depending from said rim and including a concavity and a bore communicating with said concavity, a plate secured to said rim and having means communicating with said opening, a vertically slidable resilient suction device having a yieldable flange disposed in said concavity for gripping said plate about said opening and having a reduced part slidably guided by the wall of said bore and normally projecting slightly below said tooth, and a crown mounted on said reduced part.

9. In a denture, a rim adapted to be secured to a gum and having an opening, a tooth depending from said rim and including a concavity and a bore communicating with said concavity and having slot means extending laterally of said bore, a plate secured to said rim and having means communicating with said opening, and a resilient suction device having a yieldable flange disposed in said concavity and having a reduced part slidably guided by the wall of said bore and normally projecting slightly below said tooth and including laterally extending means slidably guided by said slot means.

SAMUEL E. LINCHITZ.